United States Patent
Edic et al.

(10) Patent No.: US 8,885,910 B2
(45) Date of Patent: Nov. 11, 2014

(54) SYSTEMS AND METHODS FOR X-RAY IMAGING

(71) Applicant: General Electric Company, Schenectady, NY (US)

(72) Inventors: Peter Michael Edic, Albany, NY (US); Colin Richard Wilson, Niskayuna, NY (US); Jeffery Wayne Eberhard, Albany, NY (US); Dan Xu, Aurora, IL (US)

(73) Assignee: General Electric Company, Niskayuna, NY (US)

( * ) Notice: Subject to any disclaimer, the term of this patent is extended or adjusted under 35 U.S.C. 154(b) by 146 days.

(21) Appl. No.: 13/730,349

(22) Filed: Dec. 28, 2012

(65) Prior Publication Data
US 2014/0185901 A1    Jul. 3, 2014

(51) Int. Cl.
*G06K 9/00*     (2006.01)
*G06T 11/00*    (2006.01)
*G06F 17/50*    (2006.01)

(52) U.S. Cl.
CPC .............. *G06F 17/50* (2013.01); *G06T 11/003* (2013.01)
USPC .............................. 382/132; 378/166; 378/62

(58) Field of Classification Search
USPC ........ 382/100, 128–132; 378/62, 50–56, 166; 703/1
See application file for complete search history.

(56) References Cited

U.S. PATENT DOCUMENTS

| | | | |
|---|---|---|---|
| 4,029,963 A | 6/1977 | Alvarez et al. | |
| 7,813,474 B2 * | 10/2010 | Wu et al. | 378/16 |
| 7,835,486 B2 | 11/2010 | Basu et al. | |
| 7,885,372 B2 | 2/2011 | Edic et al. | |
| 2010/0135565 A1 * | 6/2010 | Thomsen et al. | 382/132 |
| 2011/0103550 A1 * | 5/2011 | Proksa | 378/63 |

* cited by examiner

*Primary Examiner* — Shefali Goradia
(74) *Attorney, Agent, or Firm* — Robert M. McCarthy

(57) ABSTRACT

An energy-sensitive system includes one or more processors configured to determine spectral attenuation curves for a first basis material and a second basis material, respectively. The one or more processors are configured to substitute a k-edge feature in the determined spectral attenuation curves with an approximation of the determined spectral attenuation curves lacking the k-edge feature. The one or more processors are also configured to construct a material decomposition model based on one of the determined or approximated first and second spectral attenuation curves. The one or more processors are additionally configured to decompose X-ray projection data into basis material projection data comprising first and second line integrals based, at least in part, on the model.

27 Claims, 6 Drawing Sheets

SYSTEMS AND METHODS FOR X-RAY IMAGING

BACKGROUND

The subject matter disclosed herein relates to X-ray imaging systems, such as medical and industrial X-ray computed tomography (CT) imaging systems.

In modern medicine, medical professionals routinely conduct patient imaging examinations to assess the internal tissue of a patient in a non-invasive manner. Furthermore, for industrial applications related to security or quality control, screeners may desire to non-invasively assess the contents of a container (e.g., a package or a piece of luggage) or the internal structure of a manufactured part. Accordingly, for medical, security, and industrial applications, X-ray imaging, such as X-ray computed tomography (CT) imaging, may be useful for noninvasively characterizing the internal composition of a subject of interest.

For medical, security, and industrial computed tomography (CT) imaging, some resulting images may largely be a representation of the average density of each analyzed voxel, based on the attenuation of X-rays between the X-ray source and the X-ray detector by the subject undergoing imaging. However, for energy-sensitive or multi-energy X-ray imaging, a greater amount of imaging data may be gleaned for each voxel (e.g., the effective atomic number). Further, to reconstruct multi-energy CT projection data, the underlying physical effects of the interaction of the X-rays with the subject of interest may be discerned, namely, the scattering effects and photoelectric effects, in a process known as material decomposition. Material decomposition generally involves the construction of a mathematical model of X-ray attenuation characteristics such that any material in the subject of interest is composed entirely of two or more basis materials (e.g., water and iodine). By performing material decomposition on the acquired projection data, an image, such as a basis material density image or an effective atomic number image, may be constructed based on the model.

BRIEF DESCRIPTION

In one embodiment, an energy-sensitive system includes one or more processors configured to determine spectral attenuation curves for a first basis material and a second basis material, respectively. The one or more processors are configured to substitute a k-edge feature in the determined spectral attenuation curves with an approximation of the determined spectral attenuation curves lacking the k-edge feature. The one or more processors are also configured to construct a material decomposition model based on one of the determined or approximated first and second spectral attenuation curves. The one or more processors are additionally configured to decompose X-ray projection data into basis material projection data comprising first and second line integrals based, at least in part, on the model.

In another embodiment, a method includes determining a first spectral attenuation curve for a first basis material and a second spectral attenuation curve for a second basis material. The method includes substituting the determined first and/or second spectral attenuation curves with a modified spectral attenuation curve when one or both of the first and the second spectral attenuation curves include a k-edge feature, wherein the modified spectral attenuation curve is similar to the first or the second spectral attenuation curve but includes an approximation in place of the k-edge feature. The method also includes constructing a material decomposition model based on the determined or modified first and second spectral attenuation curves and decomposing energy-sensitive X-ray projection data into basis material projection data having first and second line integrals based, at least in part, on the model.

In another embodiment, a non-transitory, computer readable medium stores instructions for execution by one or more processors of an electronic system. The instructions include instructions to receive X-ray projection data collected by an energy-sensitive X-ray system as well as instructions to determine a spectral attenuation curve for a first basis material and a second spectral attenuation curve for a second basis material. The instructions include instructions to replace a k-edge feature in the first or second spectral attenuation curve with an approximation of the first or second spectral attenuation curve that lacks the k-edge feature as well as instructions to construct a material decomposition model based on the determined or approximated first and second spectral attenuation curves. The instructions also include instructions to decompose the projection data into basis material projection data including first line integrals of the density of the first basis material and second line integrals of the density of the second basis material based, at least in part, on the model. The instructions further include instructions to reconstruct the projection data into an image based, at least in part, on the first and second line integrals of the basis material projection data.

In another embodiment, a system includes one or more processors configured to receive X-ray projection data from an energy-sensitive X-ray system, wherein the X-ray projection data includes a plurality of projection sets. The one or more processor are also configured to generate corrected X-ray projection data by substituting, in the X-ray projection data, a first projection set with a second projection set, wherein the first projection set has a p-high/p-low combination outside of a modeled range, a p-high value beyond a first threshold value, or a p-low value beyond a second threshold value, and wherein the second projection set has a p-high/p-low combination inside of the modeled range, a p-high value not beyond the first threshold, and a p-low value not beyond the second threshold value. The one or more processors are further configured to construct one or more images based, at least in part, on the corrected X-ray projection data.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As set forth above, both medical, security, and industrial applications may utilize X-ray imaging systems to obtain one or more images (e.g., density images, monochromatic images, 3D volumetric images, effective atomic number images, and so forth) based on acquired projection data. As such, methods for improving signal-to-noise ratio in projection data may provide advantages in terms of, for example, reduced radiation dose to the patient in medical imaging and/or reduced acquisition time. Further, for security and industrial applications, methods of improving effective Z estimation (e.g., the effective atomic number estimation) as well as signal-to-noise ratio may significantly improve accuracy of, for example, effective atomic number images and basis material density images, which may be of substantial interest in the field of security and quality control for manufactured parts.

Accordingly, present embodiments include systems and methods to improve the effective Z estimation using one or more modified spectral attenuation curves in place of the actual spectral attenuation curves when constructing the material decomposition model, as set forth in detail below. Furthermore, present embodiments also include methods for correcting projection sets in the projection data to further improve the quality of the resulting images (e.g., reducing streaking artifacts). Accordingly, present embodiments may generally enable improved signal-to-noise ratio in the measured projection data as well as high-fidelity effective atomic number estimates.

Figure 1:
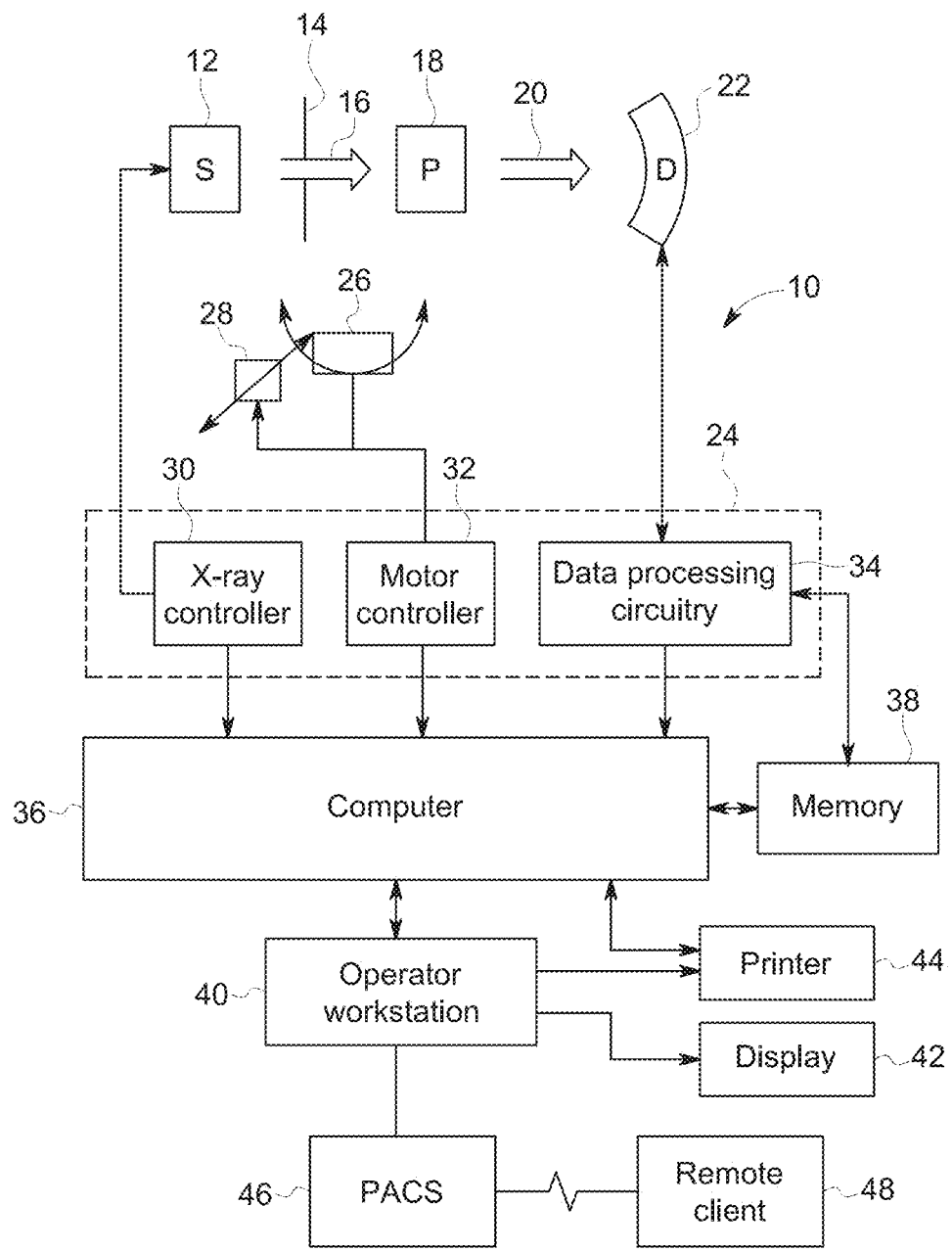
FIG. 1 is a block diagram of an X-ray computed tomography (CT) imaging system, in accordance with an embodiment of the present approach.

With the forgoing discussion in mind, FIG. 1 illustrates diagrammatically an imaging system 10 for acquiring and processing projection data. In the illustrated embodiment, system 10 is an energy-sensitive or multi-energy computed tomography (CT) system designed to acquire multi-energy projection data, to reconstruct the projection data into an image, and to process the image data for display and analysis in accordance with the present technique. The term "energy-sensitive" as used herein, denotes an X-ray detector or an X-ray imaging method involving the measurement of projection data of at least two different energies (e.g., two different frequencies). Though the imaging system 10 may be discussed in the context of medical imaging, the techniques and configurations discussed herein are applicable in other non-invasive imaging contexts, such as baggage or package screening or industrial quality control. Additionally, the techniques may be applied to X-ray projection imaging systems (e.g. non-tomographic imaging systems), or limited-angle imaging systems (e.g. tomosynthesis imaging systems) such as produced with standard X-ray imaging systems for medical and industrial imaging.

In the embodiment illustrated in FIG. 1, energy-sensitive CT imaging system 10 includes a multi-energy source 12 of X-ray radiation. As discussed in detail herein, the source 12 of X-ray radiation is a multi-energy X-ray source, such as an X-ray tube, or a distributed source configured to emit X-rays from different locations along a surface. For example, the multi-energy X-ray source 12 may include one or more addressable solid-state emitters. Such solid-state emitters may be configured as arrays of field emitters, including one-dimensional arrays, i.e., lines, and two-dimensional arrays. In certain embodiments, the multi-energy X-ray source 12 may be configured to emit X-rays of two or more stable energy levels, while in other embodiments, the X-ray source 12 may be a broadband emitter. For example, the X-ray source 12 may be a dual-energy X-ray source capable of emitting at a first energy spectrum (e.g., resulting from a peak operating voltage in the X-ray tube of approximately 140 kVp) as well as at a second energy spectrum (e.g., resulting from a peak operating voltage in the X-ray tube between 90 kVp and 110 kVp, or at approximately 80 kVp). By further example, a multi-energy source 12 may be capable of emitting X-rays of 2, 3, 4, or 5 different stable energy spectra upon application of 2, 3, 4, or 5 different stable operating voltages in the X-ray source 12 (e.g., an X-ray tube).

The multi-energy X-ray source 12 may be positioned proximate to a collimator 14. The collimator 14 may consist of one or more collimating regions, such as lead or tungsten shutters, for each emission point of the source 12. The collimator 14 typically defines the size and shape of the one or more beams of radiation 16 that pass into a region in which a subject of interest, such as a human patient 18 is positioned. A beam of radiation 16 may be generally fan-shaped or cone-shaped, depending on the configuration of the detector array. An unattenuated portion of the radiation 20 passes through the subject, which provides information about the attenuation of the subject, and impacts a detector array, represented generally at reference numeral 22.

The detector 22 is generally formed by a plurality of detector elements, which detect the X-rays that pass through or around a subject of interest. In certain embodiments, the detector 22 may be an energy-sensitive X-ray detector 22. For example, in certain embodiments of the imaging system 10 having a broad spectrum X-ray source 12, the detector 22 may include one or more filters that enable the detector 22 to selectively measure X-rays of at least two different energy ranges using these filters. In another embodiment of the energy-sensitive X-ray imaging system 10, the imaging system 10 includes an X-ray source 12 that emits X-rays of different energies at different times, and the detector 22 may be a broadband X-ray detector 22 that is synchronized with the X-ray source 12 to measure the X-rays of the different energies at the different times. As is known in the art, there are means to facilitate measurement of energy-sensitive projection data by suitable control of one or more of the X-ray source, X-ray detector, and X-ray beam filtration.

The X-ray source 12 is controlled by a system controller 24, which furnishes power, focal spot location, control signals and so forth for CT examination sequences. Moreover, the multi-energy or energy-sensitive detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry and associated memory circuitry. The associated memory circuitry may store programs and routines executed by the system controller, configuration parameters, image data, and so forth. In one embodiment, the system controller 24 may be implemented as all or part of a processor-based system such as a general-purpose or application-specific computer system.

In the embodiment illustrated in FIG. 1, system controller 24 may control the movement of a linear positioning subsystem 28 and rotational subsystem 26 via a motor controller 32. In imaging systems 10 in which the source 12 and/or the detector 22 may be rotated, the rotational subsystem 26 may rotate the X-ray source 12, the collimator 14, and/or the detector 22 through one or multiple turns around the patient 18. It should be noted that the rotational subsystem 26 may include a gantry. The linear positioning subsystem 28 enables the patient 18, or more specifically a patient table, to be displaced linearly. Thus, the patient table may be linearly moved within the gantry or within the imaging volume defined by the source 12 and/or detector 22 configuration to generate images of particular areas of the patient 18. In embodiments comprising a stationary source 12 and a stationary detector 22, the rotational subsystem 26 may be absent. Similarly, in embodiments in which the source 12 and the detector 22 are configured to provide extended or sufficient coverage along the Z-axis, i.e., the axis associated with the main length of the patient 18, the linear positioning subsystem 28 may be absent.

Further, the system controller 24 may include data processing circuitry 34. In the illustrated embodiment, the detector 22 is coupled to the system controller 24, and more particularly to the data processing circuitry 34. The data processing circuitry 34 receives data collected by the detector 22. The data processing circuitry 34 typically receives sampled analog signals from the detector 22 and converts the data to digital signals for subsequent processing by a processor-based system, such as a computer 36. Alternatively, in other embodiments, the detector 22 may include a digital-to-analog converter to convert the sampled analog signals to digital signals prior to transmission to the data processing circuitry 34. Additionally, in certain embodiments, the data processing circuitry 34 may be selectively activated by the system controller 24 (e.g., via activation signals) to receive signals from the detector 22.

Additionally, in certain embodiments, the X-ray source 12 may be controlled by an X-ray controller 30 disposed within the system controller 24. The X-ray controller 30, in certain embodiments, may be configured to provide power and timing signals to the X-ray source 12. For example, in certain embodiments, the X-ray controller 30 may include a fast-switching power supply configured to supply the source 12 with at least two or more stable biases to produce X-rays of two or more stable energy spectra. However, as set forth above, in certain embodiments, the energy-sensitive X-ray imaging system 10 may include a broad spectrum X-ray source 12.

In the depicted embodiment, the computer 36 is coupled to the system controller 24. The data collected by the data processing circuitry 34 may be transmitted to the computer 36 for subsequent processing and reconstruction. The computer 36 may comprise or communicate with a memory 38 that can store data processed by the computer 36, data to be processed by the computer 36, or routines to be executed by the computer 36, such as for processing image data in accordance with the present technique. It should be understood that any type of computer accessible memory device capable of storing the desired amount of data and/or code may be utilized by such a system 10. Moreover, the memory 38 may comprise one or more memory devices, such as magnetic or optical devices, of similar or different types, which may be local and/or remote to the system 10. The memory 38 may store data, processing parameters, and/or computer programs comprising one or more routines for performing the processes described herein.

The computer 36 may also be adapted to control features enabled by the system controller 24, i.e., scanning operations and data acquisition. Furthermore, the computer 36 may be configured to receive commands and scanning parameters from an operator via an operator workstation 40 which may be equipped with a keyboard and/or other input devices. An operator may thereby control the system 10 via the operator workstation 40. Thus, the operator may observe the reconstructed image and other data relevant to the system from computer 36, initiate imaging, select and apply image filters, and so forth. Further, the operator may manually identify features and regions of interest from the reconstructed image or the operator may review features and regions of interest automatically identified and/or enhanced through computer-aided geometry determination as discussed herein. Alternatively, automated detection algorithms may be applied to such enhanced features or regions of interest.

A display 42 coupled to the operator workstation 40 may be utilized to observe the reconstructed image. Additionally, the reconstructed image may be printed by a printer 44 which may be coupled to the operator workstation 40. The display 42 and printer 44 may also be connected to the computer 36, either directly or via the operator workstation 40. Further, the operator workstation 40 may also be coupled to a picture archiving and communications system (PACS) 46. It should be noted that PACS 46 might be coupled to a remote system 48, radiology department information system (RIS), hospital information system (HIS) or to an internal or external network, so that others at different locations may gain access to the image data.

One or more operator workstations 40 may be linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
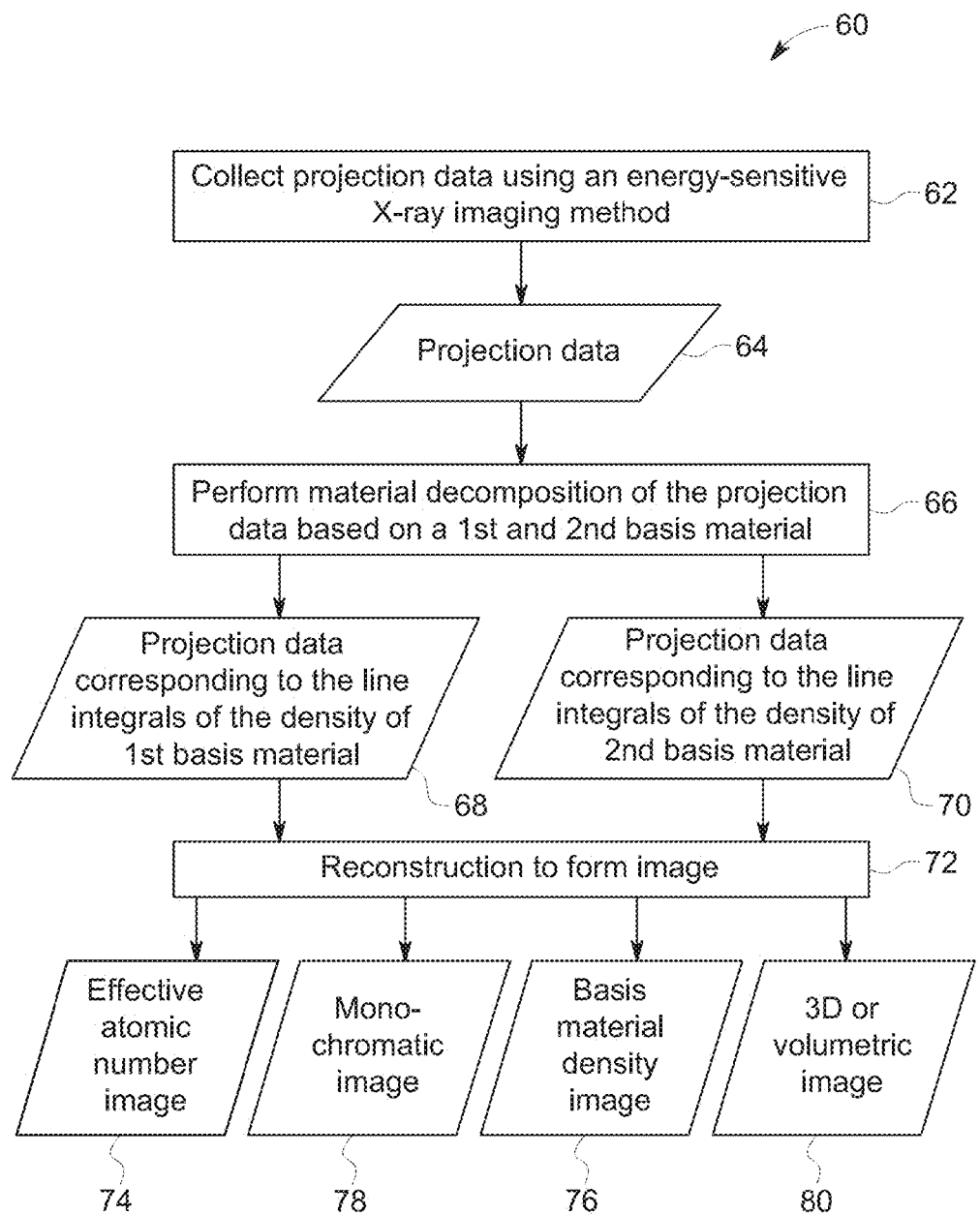
FIG. 2 is a flow diagram illustrating an embodiment of a process by which the imaging system may acquire projection data and construct one or more images from the acquired projection data.

FIG. 2 is a flow diagram illustrating an embodiment of a process 60 whereby the imaging system 10 may construct images (e.g., low-energy image, high-energy image, effective atomic number images, basis material density images, and so forth) based on acquired X-ray projection data. The process 60 begins with the energy-sensitive imaging system 10 collecting (block 62) projection data using an energy-sensitive imaging method. Accordingly, as illustrated in FIG. 2, the imaging system 10 acquires the projection data 64, which may be provided to the data processing circuitry 34 and/or the computer 36 for further processing.

The process 60 illustrated in FIG. 2 continues when one or more processors of the imaging system 10 (e.g., a processor of the data processing circuitry 34 and/or a processor of the computer 36) perform (block 66) material decomposition of the projection data based on attenuation properties of a first and a second basis material. As mentioned above and discussed in greater detail below, material decomposition generally involves the construction of a mathematical model of the X-ray attenuation characteristics of a material based on selected basis materials. Accordingly, as a result of material decomposition of the projection data based on this model, the one or more processors of the imaging system 10 may determine projection data (e.g., basis material projection data) corresponding to line integrals of the density of the first basis material 68 as well as line integrals of the density of the second basis material 70.

The process 60 illustrated in FIG. 2 concludes with reconstructing (block 72) the projection data to form one or more images. For example, the one or more processors of the imaging system 10 may use the projection data corresponding to line integrals of the density of the first and second basis materials, 68 and 70, respectively, to construct an effective atomic number image 74 and/or basis material density images 76 that may be used to predict or estimate the composition of the subject of interest. By further example, in certain embodiments, the one or more processors may utilize the projection data comprising line integrals 68 and 70, to construct monochromatic images 78 as well as 3D or volumetric images 80. Although not illustrated in FIG. 2, the projection data 64 may also be used to reconstruct energy-sensitive images (e.g. a low-energy image and/or a high-energy image) and 3D or volumetric images. Accordingly, the imaging system 10 may be used to acquire projection data 64 as well as to produce a number of different types of images based on analysis of the acquired projection data.

Figure 3:
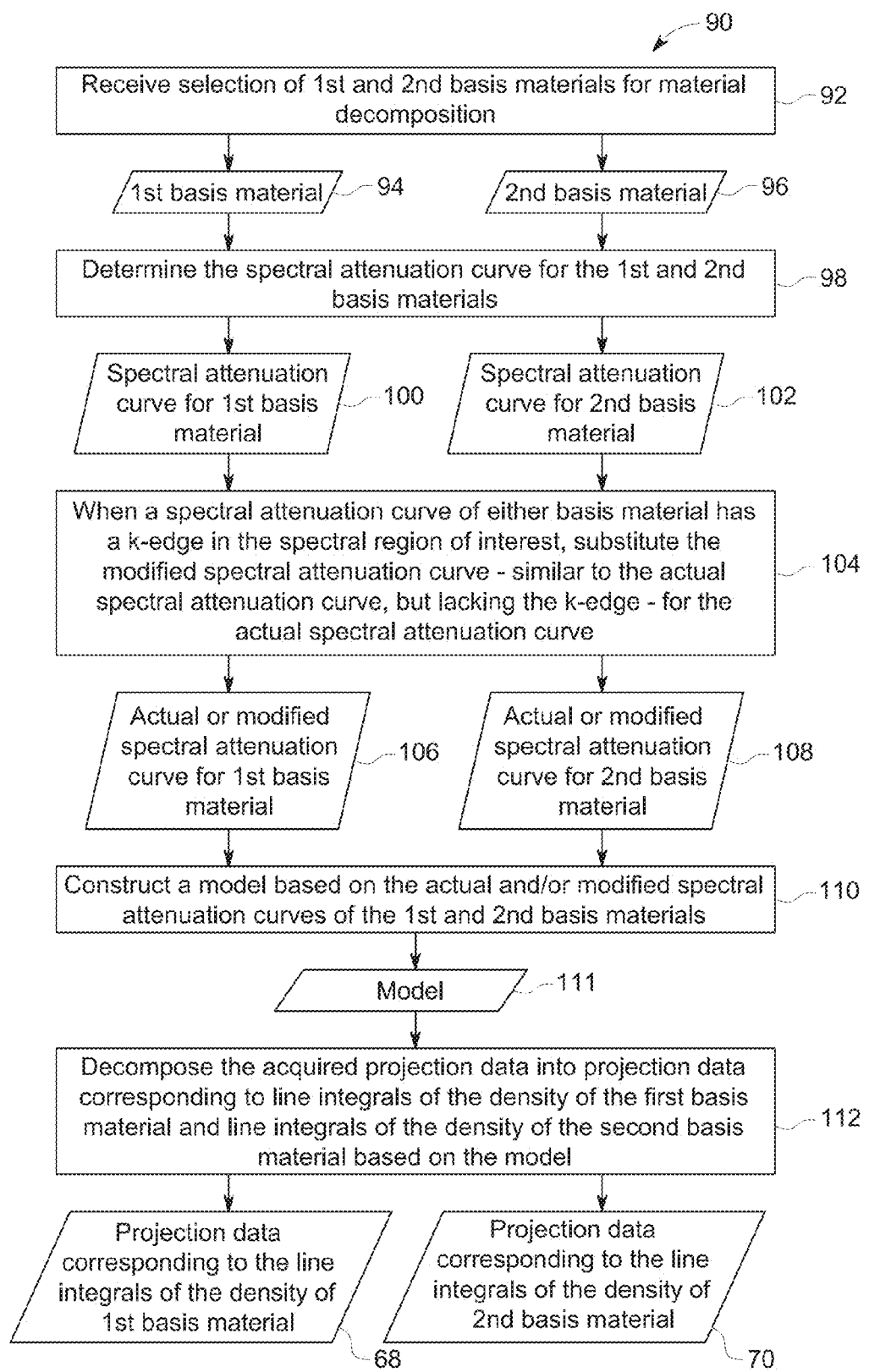
FIG. 3 is a flow diagram illustrating an embodiment of a process by which the imaging system may perform material decomposition of acquired projection data.

To better illustrate the material decomposition set forth in block 66 of FIG. 2, FIG. 3 illustrates an embodiment of a process 90 by which one or more processors of the imaging system 10 (e.g., a processor of the data processing circuitry 34 and/or a processor of the computer 36 illustrated in FIG. 1) may perform material decomposition of the acquired projection data 64. The process 90 begins with the one or more processors receiving a selection (block 92) of a first and a second basis material for the material decomposition. It should be appreciated that, in certain embodiments of the present approach, material decomposition may be performed using more than two basis materials, such as 3, 4, or even 5 basis materials. However, for the process 90 illustrated in FIG. 3, two basis materials are selected, for example, by an operator of the imaging system 10 via the operator workstation 40. For example, for medical applications, an operator may select water as a first basis material 94 and bone as a second basis material 96. By further example, for industrial applications, the operator may select water as a first basis material 94 and steel as a second basis material 96. It should be appreciated that, in certain embodiments, the selected basis materials 94 and 96 may not actually be present in the subject of interest, but rather the selected basis materials 94 and 96 may instead be similar to materials found in the subject of interest (e.g., in terms of density and/or X-ray attenuation properties). Furthermore, it should be appreciated that, in certain embodiments, a first basis material 94 may be selected to represent a first type of X-ray interaction (e.g., a low-Z material representing Compton scattering effects), while the second basis material 96 may be selected to represent a second type of X-ray interaction (e.g., a high-Z material representing photoelectric effects). However, it should be appreciated that the two basis materials may generally be selected to adequately represent the measured attenuation space.

Once the selection of the basis materials 94 and 96 has been received (e.g., in block 92), the one or more processors may next determine (block 98) a first spectral attenuation curve 100 for the first basis material 94 and a second spectral attenuation curve 102 for the second basis material 96. In certain embodiments, the imaging system 10 may store a plurality of spectral attenuation curves in a memory of the imaging system 10 (e.g., memory 38 and/or a memory of the computer 36) such that the one or more processors of the imaging system 10 may access the spectral attenuation curves for data processing, such as material decomposition. For example, one or more processors of the imaging system 10 may determine the first spectral attenuation curve 100 and the second spectral attenuation curve 102 from the memory 38 of the imaging system 10 based on the selected basis materials 94 and 96.

Figure 4:
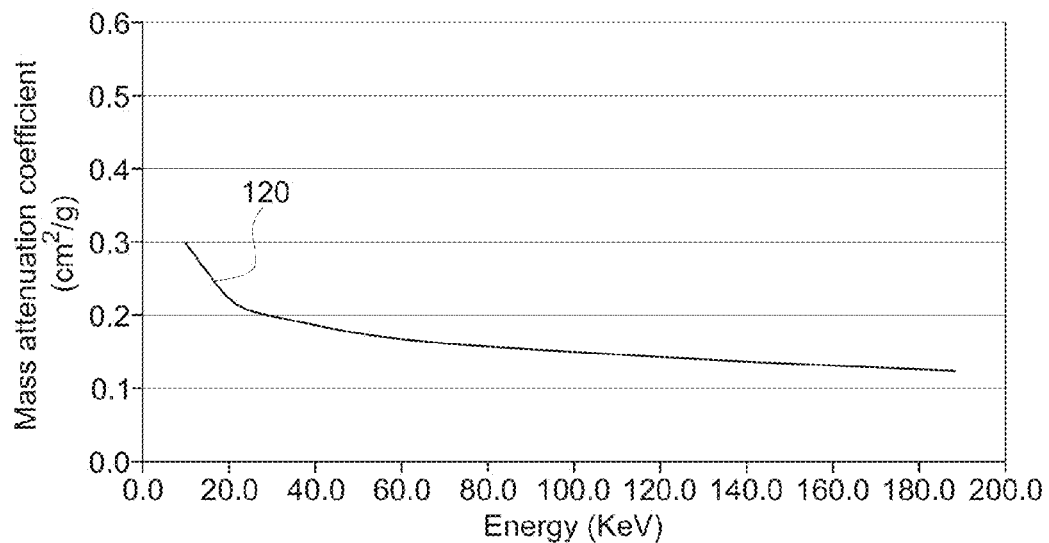
FIG. 4 is a graph illustrating a spectral attenuation curve that lacks a k-edge feature.
Figure 5:
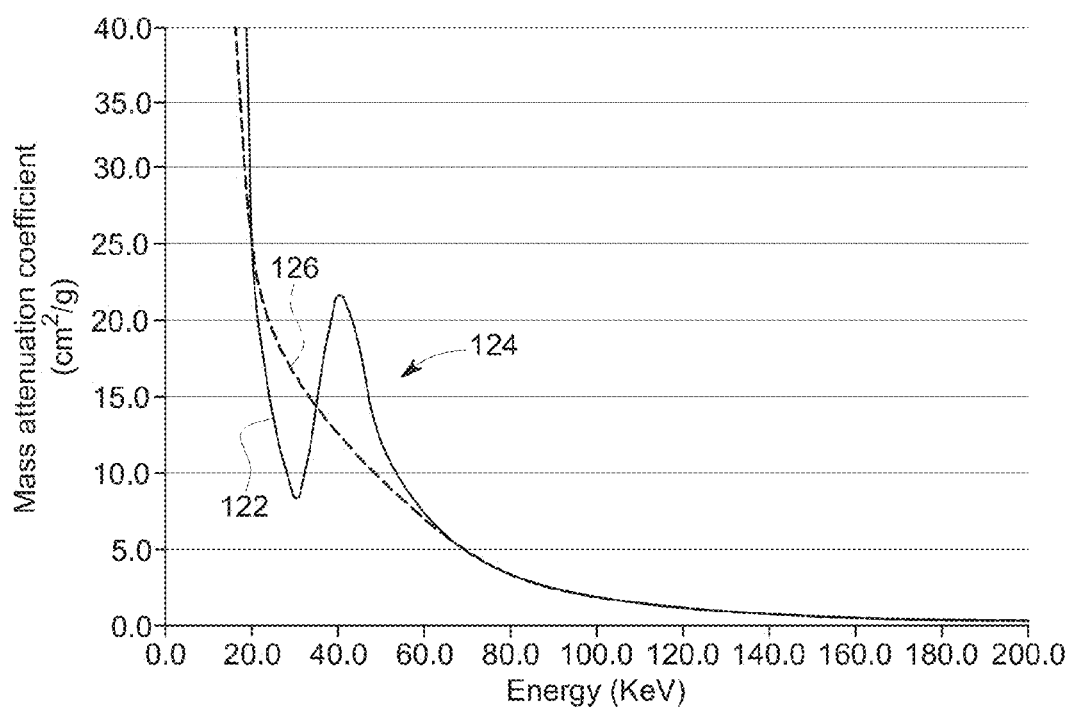
FIG. 5 is a graph illustrating a spectral attenuation curve having a k-edge feature as well as a modified spectral attenuation curve having a smoothed approximation of the k-edge feature in lieu of the k-edge feature.

After determining the first and second spectral attenuation curves 100 and 102, the one or more processors of the imaging system 10 may determine (block 104) if the first or second spectral attenuation curves 100 and 102 include a k-edge. It should be appreciated that a k-edge is a sudden change in the attenuation coefficient of the material that occurs at an energy near the binding energy of the k-shell electrons due to photoelectric absorption of the X-rays. Turning briefly to FIG. 4, a spectral attenuation curve 120 is illustrated for carbon. As illustrated by the spectral attenuation curve 120, the attenuation coefficient of carbon only gradually changes over the illustrated energy window. In contrast, turning briefly to FIG. 5, a spectral attenuation curve 122 is illustrated for iodine. As illustrated in FIG. 5, between an energy of about 20 KeV and about 60 KeV, the spectral attenuation curve 122 for iodine includes the effects of a k-edge 124, in which the attenuation coefficient of iodine is in dramatic flux.

As set forth in block 104 of FIG. 3, when the one or more processors of the imaging system 10 determine that one or both of the spectral attenuation curves 100 and 102 include a k-edge, the one or more processors may substitute all or a portion of the spectral attenuation curve with a modified spectral attenuation curve like the actual spectral attenuation curve but lacking the k-edge feature. For example, if the operator selects the first basis material 94 to be carbon (e.g., in block 92), and then the one or more processors may determine that the spectral attenuation curve 120 illustrated in FIG. 4 is the spectral attenuation curve 100 for the first basis material (e.g., in block 98), the one or more processors may determine that the actual spectral attenuation curve 106 for carbon, which lacks a k-edge feature, should be used to construct the model (e.g., in block 110).

However, in this example, if the operator selects the second basis material 96 to be iodine (e.g., in block 92 of FIG. 3), and then the one or more processors determine that the spectral attenuation curve 122 illustrated in FIG. 5 is the spectral attenuation curve 102 for the second basis material (e.g., in block 98 of FIG. 3), the one or more processors may determine that the spectral attenuation curve 122 includes a k-edge 124. In this situation, the one or more processors may determine that a modified spectral attenuation curve 108 should be used to construct the model (e.g., in block 110), rather than use the actual spectral attenuation curve 122.

Turning briefly once more to FIG. 5, an example of a modified spectral attenuation curve 126 is illustrated. As may be seen in FIG. 5, the modified spectral attenuation curve 126 for iodine tracks closely with the actual spectral attenuation curve 122 for iodine in regions away from the effects of the k-edge 124. However, in contrast to the dramatic changes in the actual spectral attenuation curve 122 at the k-edge, the illustrated modified spectral attenuation curve 126 is relatively smooth. In certain embodiments, the modified spectral attenuation curve 126 may include some or all of the features of the spectral attenuation curve 122 except the effects of the k-edge 124. In place of the effects of the k-edge 124, in certain embodiments, the modified spectral attenuation curve 126 may include a curve fit or a smoothed form (e.g., via a suitable curve fitting or smoothing method or algorithm) of the data from the k-edge region 124 of the actual spectral attenuation curve 122 that provides a substantially smooth curve throughout the spectral region of interest.

Turning him back to FIG. 3, once the one or more processors have determined whether the actual or modified spectral attenuation curves 106 and 108 should be utilized, the processors may then construct (block 110) a model 111 based on the actual and/or modified spectral attenuation curves of the first and second basis material. That is, in certain embodiments, both the spectral attenuation curve 106 of the first basis material and the spectral attenuation curve 108 of the second basis material may be modified such that they no longer include the effects of a k-edge, while in other embodiments, only one of the spectral attenuation curves 106 or 108 may be modified. Then, using the model 111, the one or more processors may decompose (block 112) the projection data into projection data (e.g., basis material projection data) corresponding to the line integrals of the density of the first basis material 68 and line integrals of the density of the second basis material 70. As set forth above, the one or more processors may then use the projection data corresponding to the first and second line integrals 68 and 70 (e.g., basis material projection data) and/or the projection data 64 to reconstruct one or more images.

It should be appreciated that, while the modified spectral attenuation curve 126 may not be completely physically accurate, substituting the k-edge region 124 of the actual spectral attenuation curve 122 with the smoother modified spectral attenuation curve 126 may afford benefits in terms of the accuracy of the resulting model 111. For example, if the subject of interest does not include a substantial amount of a material (e.g., iodine), and iodine is selected as one of the basis materials, then including the rapid fluctuation of the attenuation coefficient from the k-edge region 124 of the actual spectral attenuation curve 122 generally diminishes or reduces the accuracy of the resulting mathematical model 111 and, as a result, the resulting images (e.g., the effective atomic number image 74, the basis material density image 76, etc.). Accordingly, in certain embodiments of the present approach, the first and/or second basis materials 94 or 96 may be selected such that it is known or unlikely that the subject of interest (e.g., patient 18) includes a substantial amount of the basis material, and if the spectral attenuation curves indeed include a k-edge region 124 that may be modified, as set forth above.

Furthermore, in certain embodiments one or more processors of the imaging system 10 (e.g., a processor of the data processing circuitry 34 and/or a processor of the computer 36 illustrated in FIG. 1) may perform one or more methods to further improve the quality of resulting images (e.g., to reduce streak artifacts in, for example, the effective atomic number image 74 or the basis material density image 76). Two examples of these methods are set forth in FIGS. 6 and 7 for a dual-energy CT imaging system 10, which describe embodiments in which portions of the projection data 64 may be substituted or modified to address situations when the attenuation at the higher X-ray energy (p-high) or the attenuation at the lower X-ray energy (p-low) of a projection set is outside of the modeled range or beyond a threshold value. It should be appreciated that the methods set forth in FIGS. 6 and 7 may be used in combination with the techniques set forth in FIGS. 2 and 3 to further improve the signal-to-noise ratio and/or reduce artifacts in the measured projection data.

Figure 6:
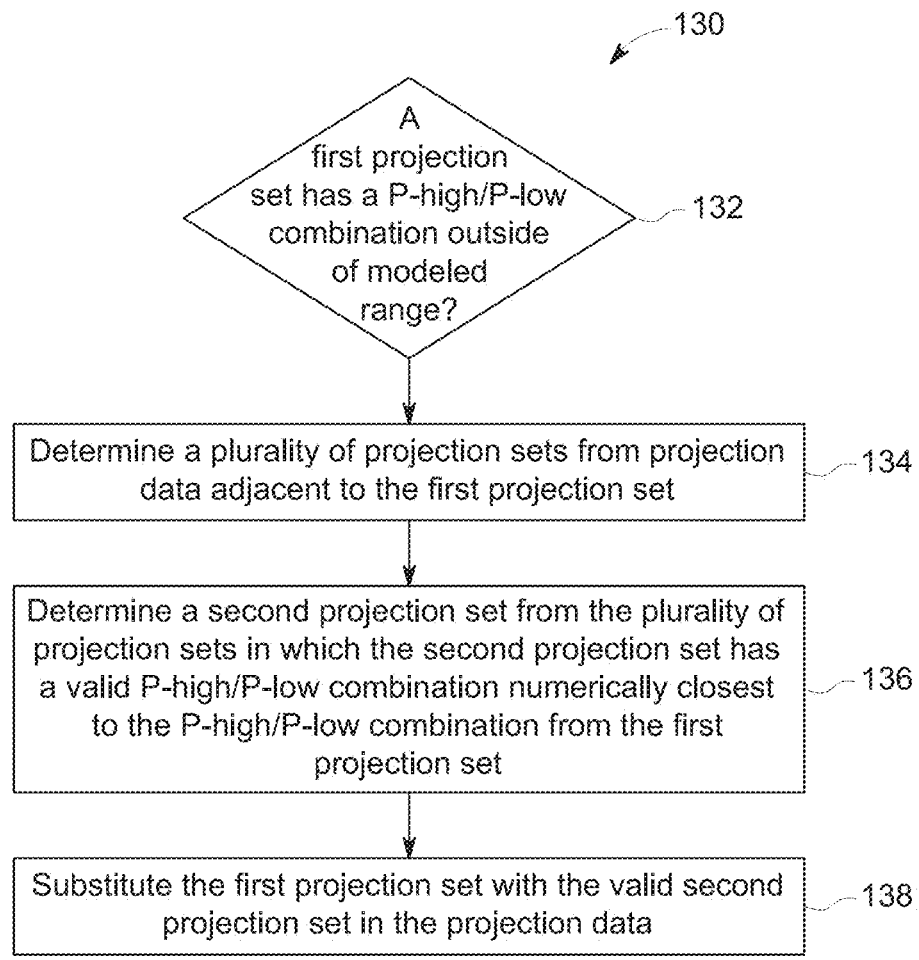
FIG. 6 is a flow diagram illustrating an embodiment of a process by which the imaging system may correct one or more projection sets in the projection data.

The embodiment of the method 130 illustrated in FIG. 6 begins when one or more processors of the imaging system 10 determine (block 132) if a first projection set has a p-high/p-low combination outside of the modeled range. When this occurs, the one or more processors may then determine (block 134) a plurality of projection sets from the projection data 64 adjacent or nearby the first projection set having the p-high/p-low combination outside of the modeled range. Then, the one or more processors may determine (block 136) a second projection set from the plurality of projection sets, the second projection set having a valid p-high/p-low combination (e.g., within the modeled range) and having a value numerically closest to the p-high/p-low combination of the first projection set. Finally, the one or more processors may substitute (block 138) the first projection set with the valid second projection set in the projection data 64, which will help reduce artifacts in the resulting images after reconstruction. It should be appreciated that, while this technique may reduce artifacts by introducing small errors in the projection data, these errors may be confined to a limited number of view angle positions.

Figure 7:
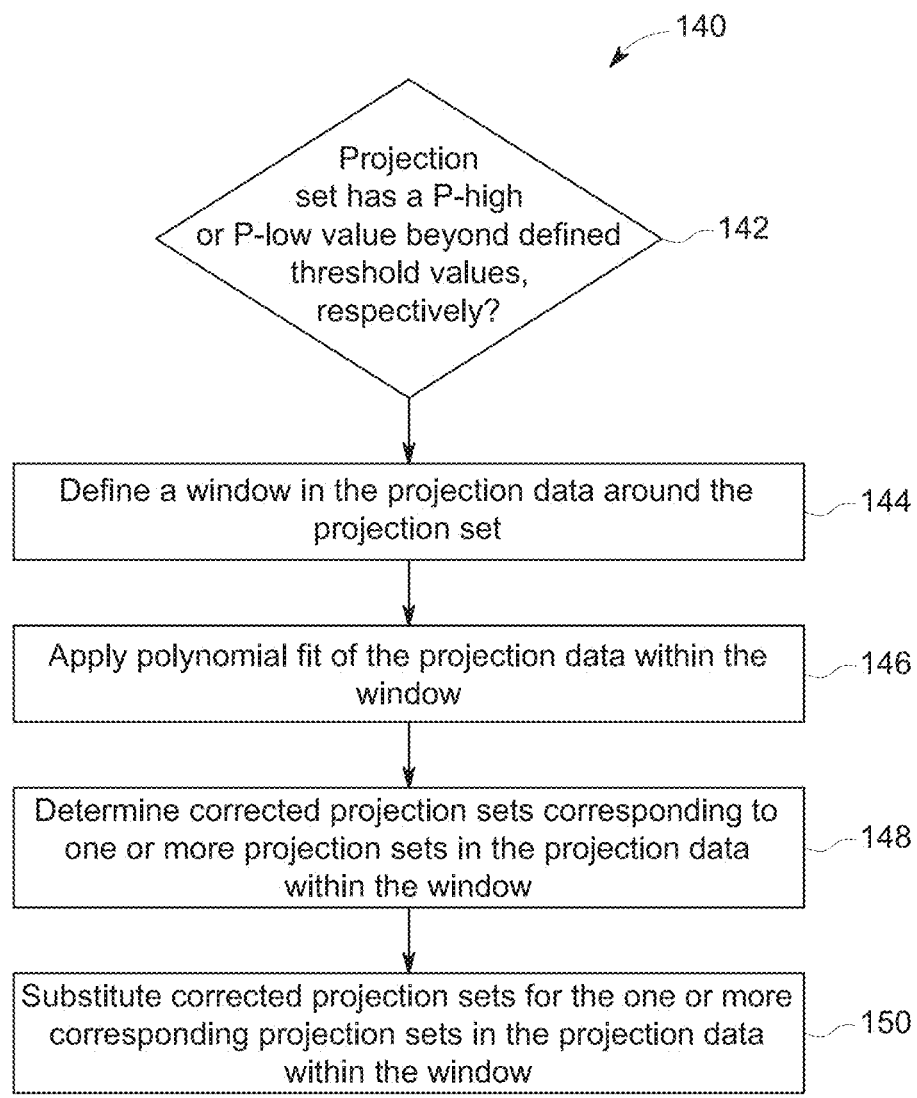
FIG. 7 is a flow diagram illustrating an embodiment of another process by which the imaging system may correct one or more projection sets in the projection data.

The embodiment of the method 140 illustrated in FIG. 7 begins when one or more processors of the imaging system 10 determine (block 142) if a projection set has a p-high or p-low value beyond a respective threshold value (e.g., p-high and p-low threshold values set by the operator that may be indicative of excessive noise in the projection data). When this occurs, the one or more processors may then define (block 144) a window or region in the projection data 64 around the offending projection set. Then, the one or more processors may apply (block 146) the polynomial fit of the projection data within the window defined in block 144. Subsequently, the one or more processors may determine (block 148) corrected projection sets corresponding to one or more projection sets within the window defined in block 144. Finally, the one or more processors may substitute (block 150) corrected projection sets for the one or more corresponding offending projection sets in the projection data within the window. As set forth above, the method 140, like the method 130, may generally reduce artifacts (e.g., streaking artifacts) in the resulting images (e.g., the effective atomic number image 74 or the basis material density image 76) after reconstruction.

Technical effects of the present approach include improved signal-to-noise ratio in the measured projection data as well as improved fidelity in effective atomic number estimates. This improved signal-to-noise and improve fidelity in the effective atomic number estimates may enable reduced acquisition times, improved efficiency of the imaging system 10, and improved image quality. In particular, the presently disclosed use of modified spectral attenuation curves in place of the actual spectral attenuation curves significantly improves effective Z estimates, especially when the basis materials are properly selected relative to the composition of the subject of interest and the measured attenuation space. Furthermore, present embodiments also include methods for correcting projection sets in the projection data to further improve the quality of the resulting images (e.g., reducing streaking artifacts).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An energy-sensitive system, comprising:
one or more processors configured to:
   determine spectral attenuation curves for a first basis material and a second basis material, respectively;
   substitute a k-edge feature in the determined spectral attenuation curves with an approximation of the determined spectral attenuation curves lacking the k-edge feature;
   construct a material decomposition model based on one of the determined or approximated first and second spectral attenuation curves; and
   decompose X-ray projection data into basis material projection data comprising first and second line integrals based, at least in part, on the model.

2. The energy-sensitive system of claim 1, wherein the one or more processors are further configured to reconstruct the basis material projection data into an image based, at least in part, on the first and second line integrals of the basis material projection data.

3. The energy-sensitive system of claim 2, wherein the one or more processors are further configured to receive X-ray projection data from data processing circuitry coupled to one or more X-ray detectors of a energy-sensitive CT system.

4. The energy-sensitive system of claim 2, wherein the image comprises an effective atomic number image, a basis material density image, a monochromatic image, a 3D image, or a volumetric image.

5. The energy-sensitive system of claim 1, configured to emit and detect X-rays of at least two energy spectra.

6. The energy-sensitive system of claim 5, wherein the first energy spectrum is generated using an X-ray tube voltage between approximately 80 kVp and 110 kVp, and wherein the second energy spectrum is generated using an X-ray tube voltage of approximately 140 kVp.

7. The energy-sensitive system of claim 1, wherein the approximation of the spectral attenuation curves comprises a high order polynomial model based on the determined first or second spectral attenuation curves.

8. The energy-sensitive system of claim 1, wherein the approximation comprises a linear or low-order polynomial approximation of the spectral attenuation curves near the k-edge feature.

9. The energy-sensitive system of claim 1, wherein the one or more processors are further configured to substitute, in the X-ray projection data, a projection set having a p-high/p-low combination outside of a modeled range with an adjacent projection set having a p-high/p-low combination inside of the modeled range.

10. The energy-sensitive system of claim 1, wherein the one or more processors are further configured to:
   define a window around a projection set having a p-high value beyond a first threshold value or p-low value beyond a second threshold value;
   apply a polynomial fit of the X-ray projection data in the window;
   determine corrected projection sets corresponding to one or more projection sets in the window; and
   substitute the projection sets with the one or more corresponding corrected projection sets in the window.

11. A method, comprising:
   determining a first spectral attenuation curve for a first basis material and a second spectral attenuation curve for a second basis material;
   substituting the determined first and/or second spectral attenuation curves with a modified spectral attenuation curve when one or both of the first and the second spectral attenuation curves include a k-edge feature, wherein the modified spectral attenuation curve is similar to the first or the second spectral attenuation curve but includes an approximation in place of the k-edge feature;
   constructing a material decomposition model based on one of the determined or modified first and second spectral attenuation curves;
   decomposing energy-sensitive X-ray projection data into basis material projection data comprising first and second line integrals based, at least in part, on the model.

12. The method of claim 11, further comprising reconstructing the basis material projection data into an image based, at least in part, on the first and second line integrals of the basis material projection data.

13. The method of claim 12, wherein reconstructing the basis material projection data into the image comprises constructing an effective atomic number image, a mono-chromatic image, a basis material density image, a 3D image, or a volumetric image.

14. The method of claim 11, further comprising receiving energy-sensitive X-ray projection data from data processing circuitry coupled to one or more X-ray detectors configured to detect attenuated X-rays of at least a first energy spectrum and a second energy spectrum.

15. The method of claim 14, further comprising generating the first energy spectrum using an X-ray tube voltage that is between approximately 80 kVp and 110 kVp, and generating the second energy spectrum using an X-ray tube voltage that is approximately 140 kVp.

16. The method of claim 11, further comprising substituting, in the energy-sensitive X-ray projection data, a projection set having a p-high/p-low combination outside of a modeled range with an adjacent projection set having a p-high/p-low combination inside of the modeled range, wherein the adjacent projection set is numerically closest to the projection set.

17. The method of claim 11, further comprising:
   defining a window around a projection set having a p-high value beyond a first threshold value or p-low value beyond a second threshold value;
   applying a polynomial fit of the projection data in the window;
   determining corrected projection sets corresponding to one or more projection sets in the projection data in the window; and
   substituting the projection sets with the one or more corresponding corrected projection sets in the projection data in the window.

18. A non-transitory, computer readable medium storing instructions for execution by one or more processors of an electronic system, the instructions comprising:

instructions to receive X-ray projection data collected by an energy-sensitive X-ray system;

instructions to determine a spectral attenuation curve for a first basis material and a second spectral attenuation curve for a second basis material;

instructions to replace a k-edge feature in the first or second spectral attenuation curve with an approximation of the first or second spectral attenuation curve that lacks the k-edge feature;

instructions to construct a material decomposition model based on one of the determined or approximated first and second spectral attenuation curves;

instructions to decompose the projection data into basis material projection data comprising first line integrals of the density of the first basis material and second line integrals of the density of the second basis material based, at least in part, on the model; and instructions to reconstruct the projection data into an image based, at least in part, on the first and second line integrals of the basis material projection data.

19. The medium of claim 18, further comprising instructions to substitute, in the X-ray projection data, a projection set having a p-high/p-low combination outside of a modeled range with an adjacent projection set having a p-high/p-low combination inside of the modeled range.

20. The medium of claim 18, further comprising:
instructions to define a window around a projection set having a p-high value beyond a first threshold value or p-low value beyond a second threshold value;
instructions to apply a polynomial fit of the projection data in the window;
instructions to determine corrected projection sets corresponding to one or more projection sets in the projection data in the window; and
instructions to substitute the projection sets with the one or more corresponding corrected projection sets in the X-ray projection data in the window.

21. The medium of claim 18, wherein the image comprises an effective atomic number image, a basis material density image, a monochromatic image, a 3D image, or a volumetric image.

22. A system, comprising:
one or more processors configured to:
receive X-ray projection data from an energy-sensitive X-ray system, wherein the X-ray projection data comprises a plurality of projection sets;
generate corrected X-ray projection data by substituting, in the X-ray projection data, a first projection set with a second projection set, wherein the first projection set has a p-high/p-low combination outside of a modeled range, a p-high value beyond a first threshold value, or a p-low value beyond a second threshold value, and wherein the second projection set has a p-high/p-low combination inside of the modeled range, a p-high value not beyond the first threshold, and a p-low value not beyond the second threshold value; and
construct one or more images based, at least in part, on the corrected X-ray projection data.

23. The system of claim 22, wherein the second projection set is one of the plurality of projection sets, and wherein the second projection set is adjacent to the first projection set in X-ray projection data.

24. The system of claim 22, wherein the one or more processors are further configured to:
define a window around the first projection set in the X-ray projection data;
apply a polynomial fit of the X-ray projection data in the window; and
determine the second projection set based on the polynomial fit.

25. The system of claim 22, wherein the one or more images comprise a low-energy image, a high-energy image, a 3D image, or a volumetric image.

26. The system of claim 22, wherein the one or more processors are further configured to perform material decomposition of the corrected X-ray projection data using a modified spectral attenuation curve of a basis material, wherein the modified spectral attenuation curve is an approximation of an actual spectral attenuation curve that lacks a k-edge feature, to generate basis material projection data.

27. The system of claim 26, wherein the one or more images comprise an effective atomic number image, a monochromatic image, or a basis material density images based on the basis material projection data.

* * * * *